Patented May 20, 1924.

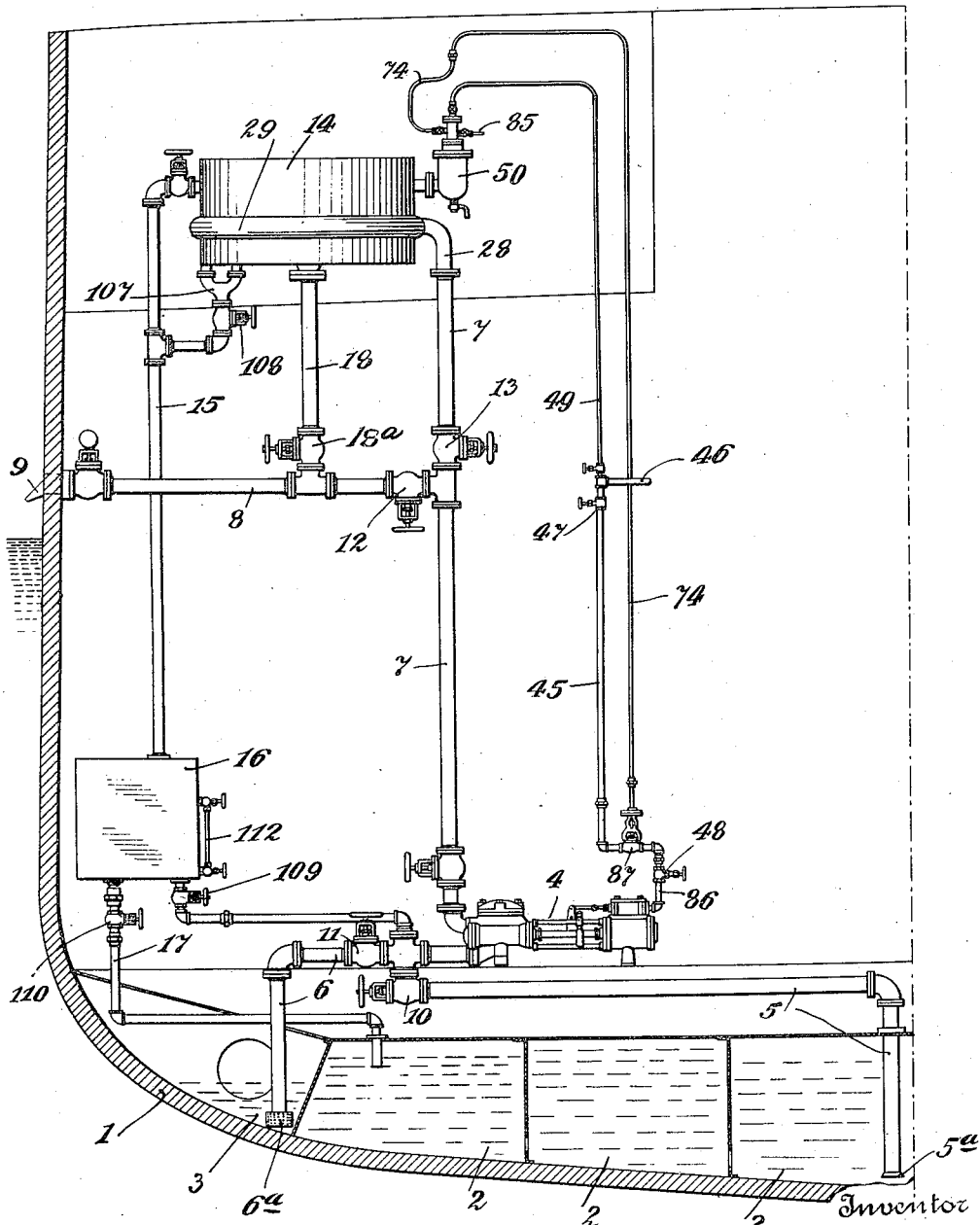

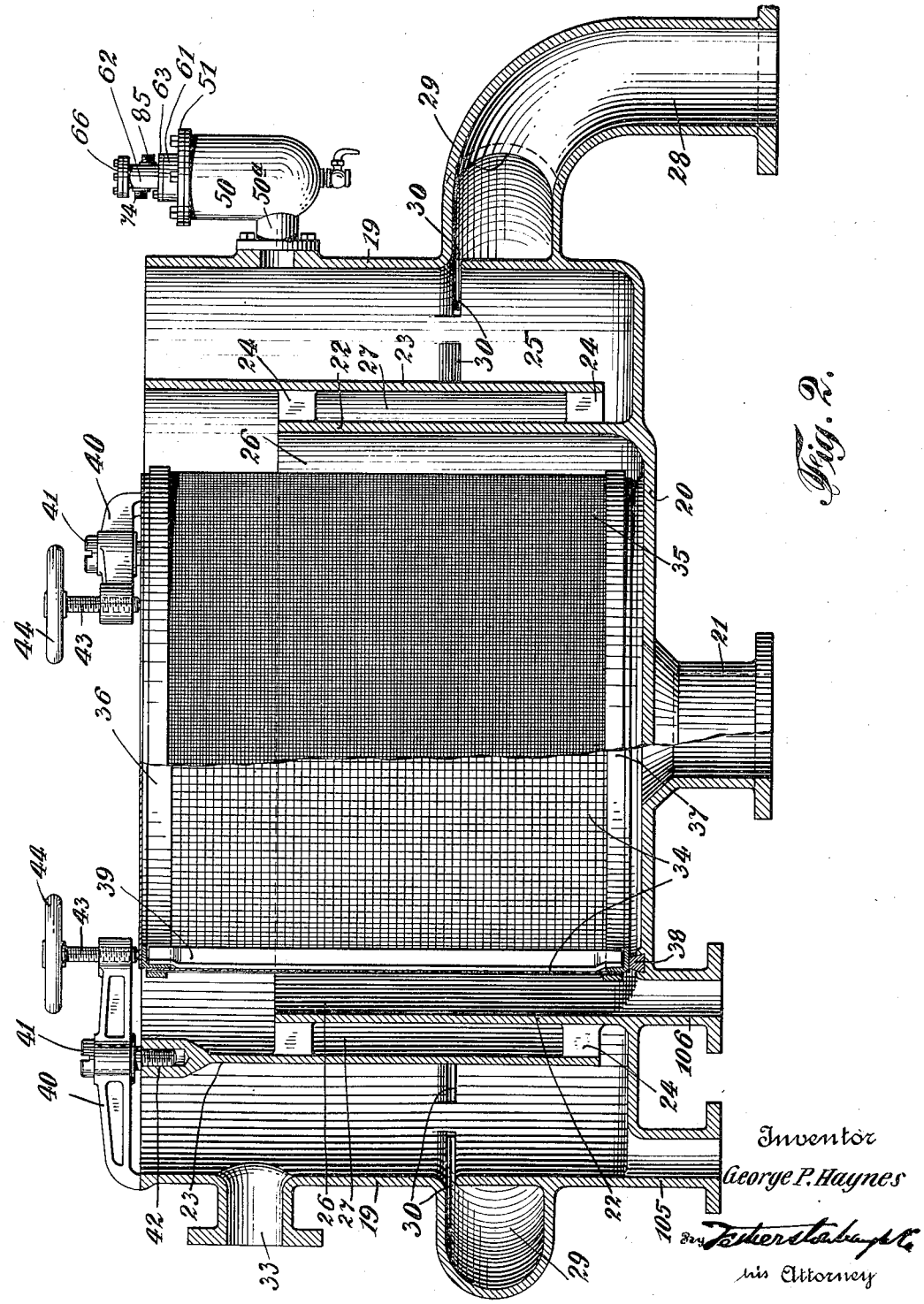

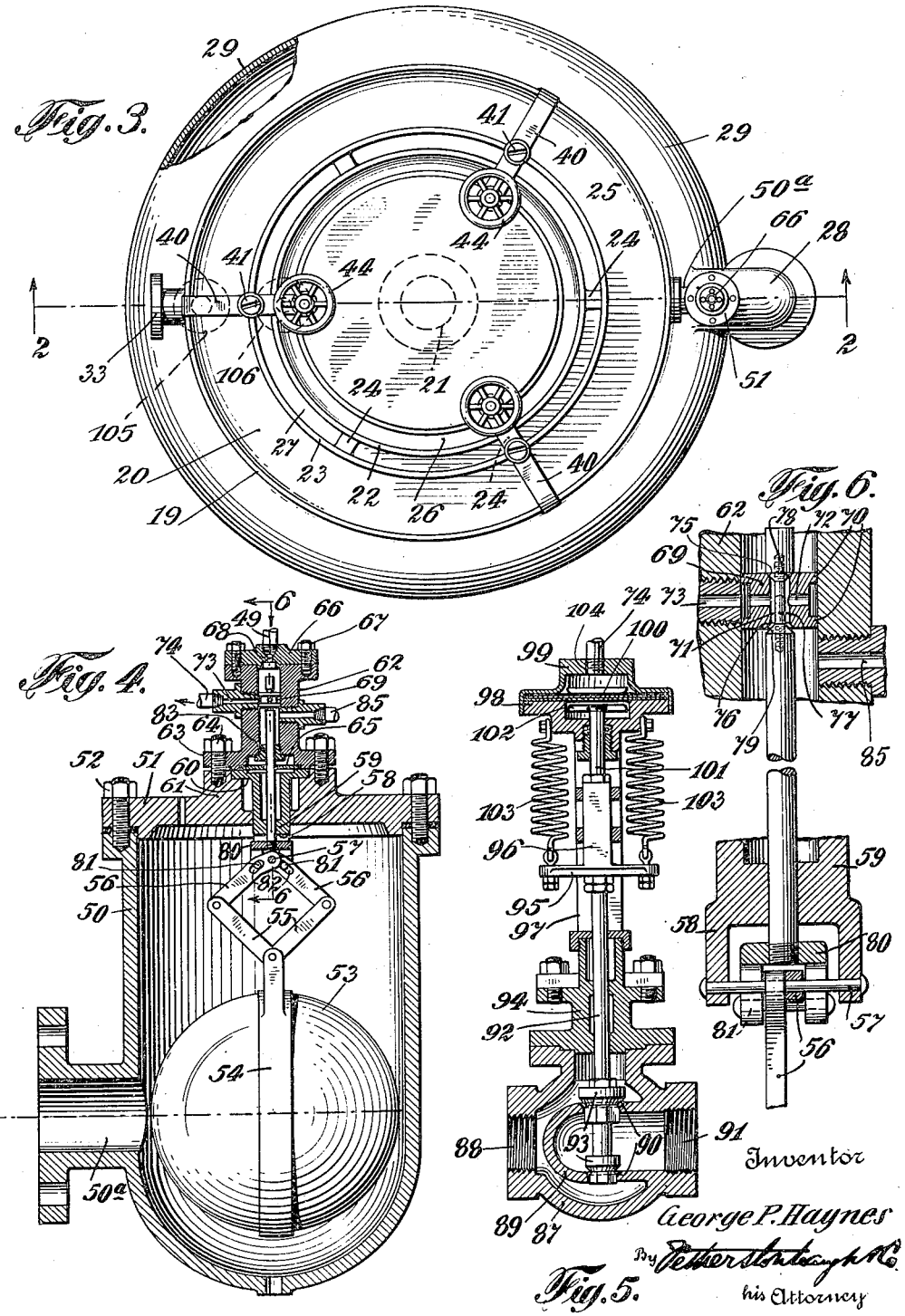

1,494,906

UNITED STATES PATENT OFFICE.

GEORGE P. HAYNES, OF NEW YORK, N. Y., ASSIGNOR TO TODD SHIPYARDS CORPORATION, OF NEW YORK, N. Y., A CORPORATION OF NEW YORK.

OIL AND WATER SEPARATING MEANS FOR SHIPS' USE.

Application filed July 20, 1922. Serial No. 576,352.

*To all whom it may concern:*

Be it known that I, GEORGE PERRY HAYNES, a citizen of the United States, residing at the borough of Manhattan, in the city, county, and State of New York, have invented certain new and useful Improvements in Improved Oil and Water Separating Means for Ships' Use, of which the following is a clear and exact specification.

This invention relates to means for separating oil from water, and my improvements comprehend generally a new system whereby the bilges of oil burning ships, as well as the oil carrying compartments which are also used for water ballast, may be pumped out, in order to put the water overboard and to otherwise dispose of the oil which has been separated therefrom.

It is now contrary to law in some ports for the masters of oil burning ships to permit the bilge water or ballast water to be put overboard while in harbor because the bilge water usually contains oil that has leaked out from the oil compartments and pipe joints into the bilges, and the ballast water contains residual oil in instances where the same compartments are used at different times for oil and water. The oil thus put overboard pollutes the harbor water, contaminating the beaches and also, by collecting around piers, etc., thereby adding to the fire risks.

Oil burning ships are now equipped with means whereby the bilge water, or ballast water which may contain oil, is pumped overboard, this practice being desirable and necessary while the ship is at sea. Therefore it is not the purpose of my invention to negative or dispense with the existing systems installed for the performance of this practice.

Rather my invention comprises an amplification of the existing practice by the institution of an improved system possessing these characteristics:

(1) The inclusion in the present overboard pumping systems of means for separating the contained oil from the bilge water, or ballast water, with means for collecting the oil, and means for filtering the water prior to its delivery overboard.

(2) The inclusion in the present systems of overboard discharge means for the mingled water and oil contents of ship bilges and compartments for oil and ballast water, of means for shutting off the direct overboard delivery, oil and water separating means including water filtering means, means for conveying the water and oil contents thereto, means for directing the filtered water to the overboard discharge means, and means for delivering the separated oil to a receptacle provided therefor on shipboard.

(3) The inclusion in the present systems of overboard discharge for mingled water and oil pumped from a ship's bilges or compartments which contain water and oil, of means for separating the water and oil so that they may be separately delivered, means for filtering the water prior to its discharge overboard, and means for governing the pumping operating in accordance with the variable capacity of the filtering means.

Other features and advantages of my invention will hereinafter appear.

In the drawings:—

Figure 1 is a partial view, diagrammatic in character, of a ship's hull, including a showing of its oil tanks, which may also be used for water ballast, and the bilge at one side thereof, the view further representing an installation of a pumping and separating system for oil and water devised and arranged according to my invention.

Fig. 2 is an enlarged, vertical sectional view of a form of separator for oil and water, with filtration means, devised by me as a part of the system shown in Fig. 1.

Fig. 3 is a top view of Fig. 2 partly broken away.

Fig. 4 is an enlarged vertical sectional view of the governor whereby the supply of steam to the pump is automatically controlled according to the fluid level in the separator.

Fig. 5 is a similar view of the pump control valve which is actuated by the governor, and Fig. 6 is an enlarged detail view of a portion of the governor mechanism taken on the line 6—6 of Fig. 4.

In Fig. 1 let the numeral 1 indicate a portion of a ship's hull, having in its bottom the compartments 2 which may serve to contain fuel oil, or ballast water, and let 3 indicate the ship's bilge.

According to usual practice a pump 4 may serve to discharge the compartments 2 and bilge 3, by means respectively of the piping 5 and 6 leading to the pump therefrom, and the piping 7 and 8 leading from the pump to an overboard discharge outlet 9. Valves 10 and 11 provided respectively in the piping 5 and 6 permit independent discharge from either the compartment or the bilge. The discharge system thus far described enables the bilge water, with whatever oil contents it may have, to be pumped overboard, which practice is desirable when the ship is at sea, as also it is desirable to discharge ballast water from the compartments 2. Therefore this pumping system is retained by me and made a part of my improved system. In the new system however the pipe 8 is provided with a valve 12 to shut it off from direct communication with the discharge flow from pipe 7, and a valve 13 in pipe 7 is opened to enable communication to be had with a separating device 14, which will be more particularly described hereinafter. The device 14 separates the oil from the water, delivering the oil through a pipe 15 to container 16, from whence it may be returned, through pipe 17, to the compartments 2.

The water, from which the oil has been separated, is also subjected to filtration in device 14, and is delivered in clean state through pipe 18 by way of valve 18ᵃ to pipe 8, for overboard discharge at outlet 9.

Hence, in its broadest aspect, it will be seen that my invention comprehends an elaboration of the usual overboard discharge system by the inclusion of means for separating the oil from the water and collecting the oil, and, as will appear, the separating device is also provided with means for filtering the water prior to its discharge overboard.

The separator.

The example here shown of the means employed by me for the separation of oil from water pumped out of the bilge or compartments comprises a cylindrical wall 19, open at its upper end and having a base closure 20 that is provided with a central discharge outlet 21 adapted to communicate with the pipe 18. Extended upwardly from the base 20 is an inner, concentric wall 22; and, intermediate walls 19, 22 is another concentric wall 23, which is supported as by webs 24 that connect it with wall 22, because this intermediate wall 23 is intended to serve as a baffle and it is not extended down to the base 20.

There is thus provided an outer chamber 25, an inner chamber 26, and an intermediary chamber 27, but chambers 25 and 27 are in communication at or near their lower portions.

A pipe or fitting 28, which is adapted to be put in communication with pipe 7, also communicates with a hollow, annular enlargement 29 that surrounds wall 19, entry into chamber 25 being permitted through a series of relatively narrow, horizontal slits 30 in wall 19.

From the foregoing description it will be appreciated that liquid pumped up pipe 7, valve 12 being closed and valve 13 open, will enter the annular enlargement 29, and thence will pass through slits 30 into chamber 25. It is assumed that the compartments 2 or the bilge 3 contain water with oil, but the oil content, by reason of its lighter specific gravity, will be on top of the water. Therefore the nozzles 5ᵃ and 6ᵃ respectively for pipes 5 and 6, being located at the bottom, will first receive water, and it is my purpose that water only be pumped into chamber 25 until the liquid level has risen to a point above the lower edge of baffle 23. Then, as the pumping operation continues and the liquid level rises in chamber 25 the oil contents of the compartments 2 or bilge 3 will be pumped up and enter chamber 25, but the oil will be trapped in said chamber because it will rise therein to the top of the water. An outlet 33 in wall 19 limits the level of the oil by causing it to pass off, through pipe 15, as to the container 16. The water that is pumped from compartments 2 or bilge 3 will well up within chamber 27, flowing over the top of wall 22 into central chamber 26. But, obviously relatively no oil will enter chamber 27 because the liquid ingress to chamber 25 through slits 30 is well above the base of wall 23. Therefore as a water seal will have been formed between chambers 25 and 27 before oil is delivered to the chamber 25, the wall 23 provides a very effectual barrier to separate the oil from the water. Disposed within this chamber 26 is a filter whose function is to cleanse the water before it is allowed to pass through outlet 21 for delivery overboard.

The filter.

The example of a filter such as I may employ for this purpose and as herein illustrated is composed of a frame of wire mesh, in cylindrical form, indicated at 34, this frame serving as a support for a covering of suitable fabric, as 35, which is fitted or wrapped thereover. I have found that ordinary towelling answers the purpose of a good filtering medium, but any other suitble material may of course be employed. A particular function of the filter is to prevent the passage to outlet 21 of any oil which may enter chamber 26.

The wire mesh frame is stiffened at top and bottom by rings or hoops 36, 37 of angle iron, the lower ring 37 being supported upon an annular grummet or gasket 38, that is fitted within a channel therefore in the base 20. Also the frame 34 is stiffened by vertical bars 39. The filter, thus constituted, may be removably inserted within chamber 26, and can be suitably secured therein.

The securing means herein shown consist of three equi-spaced clamp arms 40, each having an orifice intermediate its length to receive a screw 41, for whose reception a threaded socket 42 is provided in an enlargement of the wall 23. The arms 40 each bear at one end upon the wall 19, and at their other end have a threaded aperture for the passage of a clamping screw 43 having a hand wheel 44, so that the screw 43 can be turned to bear upon ring 36 and thus press the filter frame tightly against gasket 38, to hold it in place.

When a filter is to be removed as for cleansing purposes the screws 43 are first loosened, and then the arms 40 can be swung out of the path of the filter to permit its withdrawal. A new filter can then be quickly installed.

In the operation of the filter the liquid, from which most of the oil has been separated by the baffle means described, flowing over the top of wall 22, and welling up within chamber 26, outside the filter, will percolate through the filtering material 35 for discharge by way of outlet 21.

Foreign matter and any oil which is retained on the outer surface of the filtering material 35 will impair the efficiency of the filter, so that after some service the full volume of liquid delivered to chamber 26 will fail to penetrate the filter at the same rate of flow. Consequently unless the delivery flow rate be reduced, the liquid will rise in the apparatus to the point of overflowing. To prevent this occurrence I provide means for controlling the supply of steam for the operation of the pump so that the delivery of liquid from the bilge and compartments may be regulated proportionately to the variable flow capacity of the filter.

*The governor.*

The pump 4 is supplied with steam for its operation as by a pipe 45, which is in communication with a main supply pipe 46; under control by valves 47 and 48, valve 48 being the throttle valve; the main 46 also supplying steam through pipe 49 to valve mechanism mounted on a governor casing 50, which is secured to wall 19 of the separator by a hollow connection 50ª.

The casing 50 is in the form of a vertical cylinder, having a removable head plate 51 which is secured thereto as by screw bolt 52, the plate 51 carrying certain steam control valve mechanism that is actuable by a float 53 contained within the casing. The float 53 connects, as by a strap 54, with a pair of toggle arms 55, to which are pivoted a pair of opposed toggle arms 56, that, at their outer ends, are engaged by a pivot 57, which is carried by a yoke 58, forming the lower end of a thimble 59, that is extended centrally through an orifice therefor in plate 51; the thimble having an annular flange 60 whereby it is seated in a recess provided therefor in a boss 61 upon the upper surface of plate 51.

A cylindrical, valve housing member 62 has a lower flange 63 by which it is seated upon boss 61, being secured thereto as by screws 64; also a diaphragm 65 is clamped between flanges 60, 63, to separate the members 59, 62. The member 62 is shown as provided with head closure member 66, secured thereto as by screws 67, and is provided with inlet means 68 for steam supplied thereto by pipe 49.

Within the housing member 62 is fitted a valve in the form of a cylinder 69, with upper and lower flanges 70 that engage the inner surface of member 62, leaving an annular clearance between them. The cylinder 69 is pierced with a central bore 71, and is also provided with radial apertures 72. The member 62 is provided with an outlet 73 in communication with the clearance between flanges 70, for the supply of steam to a pipe 74. This pipe 74, as will hereinafter appear, connects with certain valve mechanism which controls the admission of steam to the pump.

The bore 71 of cylinder 69 is provided with upper seats 75 and lower seat 76, and a valve stem 77, operable through bore 71, has the conoidal portions 78, 79 which respectively co-act with seats 75, 76, according to the lowered or raised position of the stem. At the lower end of stem 77 it is provided with a yoke 80, to which pivot pins 81, 81 are secured, these pins loosely engaging in angular slots 82, 82 formed respectively in each of the toggle arms 56.

In Fig. 4 the float is shown as buoyed only to a height where the system is functioning normally, with the filter carrying off the volume of water supplied by the pump. At this time the valve portion 78 is closed upon seats 75, thus preventing the passage of steam from pipe 49. But as the filter clogs up so that the liquid level rises in the separating device, and enters casing 50 through connection 50ª, float 53, then also rising, thereby collapses the toggle arms 55, 56, and in this action the pins 81 are pressed upwardly carrying with them the yoke 80 and stem portion 78 from seat 75.

This action opens the valve for the admission of steam from pipe 49, through bore 71 and apertures 72 to pipe 74, the pressure thus directed having the effect of closing a valve which controls the supply of steam to the pump. The stem 77 operates through a guide 83 and also through diaphragm 65. An exhaust outlet 85 in housing 62 relieves pressure to the atmosphere upon the return movement of stem 77, the conoidal portion 79 at that time leaving seat 76 to provide the necessary clearance.

*The governor controlled pump valve.*

When the governor responds to a rising liquid level in the separator, thereby causing steam to be admitted to pipe 74, the pressure thus directed is utilized in closing a valve located in the feed pipe 86 which conveys steam to pump 4. This valve, as here shown, is of the balanced type, having the housing 87, with steam inlet 88, inner shell 89, with upper and lower seats 90, and outlet 91. The valve stem 92, having upper and lower conoidal valve elements 93, to co-act with the seats 90 respectively, is operable through an upper valve portion 94, and engages a cross-bar 95 which has a squared shank 96 that is slidable in a vertical guide 97, extended from portion 94. The guide 97 terminates in a circular, cup shaped portion 98, upon which there is fitted a hollow cap 99, the portion 98 and cap 99 clamping between them a flexible diaphragm 100. A rod 101, forming a continuation of shank 96, is provided with a washer 102 at its upper end by which it abuts against diaphragm 100 under the tension of springs 103 which extend between cross-bar 95 and portion 98. Hence the springs 103 normally hold the valve portions 93 away from their seats 90, thus permitting the flow of steam from the main 46, through pipe 45, to supply the pump through the valve. But since the cap 99 is provided with inlet 104 it will be obvious that when steam is caused by the governor operation to enter from pipe 49, the steam will be admitted at inlet 104 to cap 99 by way of pipe 74, and its pressure will take effect upon diaphragm 100, depressing it and stem 92, thereby seating the valve portions 93, and shutting off the supply of steam to the pump.

With the consequent cessation of the pumping operation the liquid level in the separator will fall as the filter continues to more sluggishly perform its function; and, automatically, as the governor valve shuts off the supply of steam to pipe 49, thereby relieving the pressure upon diaphragm 100, the springs 103 will again raise stem 92 and thus re-open the valve for the supply of steam to operate the pump.

For cleaning out purposes the separator device is provided with drainage outlets 105, 106, the outlet 105 serving chamber 25, and the outlet 106 serving chamber 26. These outlets are shown as merged in a union 107, having a valve 108, and connecting with the pipe 15. Thus, upon opening valve 108, the chambers 25, 26 may be drained into receptacle 16.

In the practice of the system, water as well as oil will enter receptacle 16, so that while it may be desirable to return the oil content of the receptacle to the compartments 2, it is necessary to first dispose of the water. This is accomplished by opening valve 109, leaving valve 110 closed. Then, upon starting up the pump the water content of receptacle 16 can be pumped up pipe 7 back to the separator for a second filtration. This operation is continued until the water is exhausted, when the pump must be stopped and valve 109 closed. Then valve 110 can be opened and the oil content of receptacle 16 allowed to flow through pipe 17 into compartments 2.

A sight tube 112 affords visual indication of the respective water and oil levels in receptacle 16, so that the attendant will know when the water has been exhausted therefrom by the pump.

I do not confine my system to the entire installation thereof on ship-board, recognizing that, for example, the separator may be located on a pier, to serve different ships. In fact the entire system may also be employed in land plants where oil is to be separated from water either to conserve the oil, or to free discharge water from oil.

Variations within the spirit and scope of my invention are equally comprehended by the foregoing disclosure.

I claim:—

1. In a ship, the combination with a pump of direct and by-pass discharge piping leading from said pump, control means for causing flow from the pump selectively through the direct and by-pass pipings and an oil and water separator interposed in the by-pass connection.

2. In a ship, the combination with a pump of direct and by-pass discharge piping leading from said pump, control means for causing flow from the pump selectively through the direct and by-pass pipings, and a separator interposed in said by-pass piping designed to separate oil and water delivered from the pump, said separator being provided with a filter arranged to filter the water discharged from the separator.

3. In a ship, the combination with a pump of direct and by-pass discharge piping leading from said pump, control means for causing flow from the pump selectively through the direct and by-pass pipings, an oil and water separator interposed in the by-pass connection, and means governed by the quantity of oil and water in the separator to regulate the delivery action of the pump.

4. In a ship, the combination with a pump of direct and by-pass discharge piping leading from said pump, control means for causing flow from the pump selectively through the direct and by-pass pipings, a separator interposed in said by-pass piping designed to separate oil and water delivered from the pump, said separator being provided with a filter arranged to filter the water discharged from the separator, and means governed by the quantity of oil and water in the separator to regulate the delivery action of said pump.

5. The combination in a ship having overboard discharge means for liquid contained therein, said discharge means including a pump and piping extending from a lower part of the ship to an outlet from the ship above the level of the supporting body of water, of a separator for oil and water disposed in the ship at a higher point than the outlet, a pipe leading from the pump to the separator, means for shutting off the direct service from the pump to the discharge outlet to permit delivery to the separator, means for shutting off the pipe leading from the pump to the separator when direct discharge is to be effected, an oil receptacle, means for delivering oil from the separator to said receptacle, means for shutting off said delivery means, controlled means for returning oil from said receptacle to the liquid container in the lower portion of the ship, and controlled means for delivering water from the separator to the direct overboard discharge line.

Signed at the borough of Manhattan, in the city, county and State of New York, this 13th day of July, 1922.

GEORGE P. HAYNES.